United States Patent
Ohara et al.

(10) Patent No.: US 12,309,853 B2
(45) Date of Patent: May 20, 2025

(54) TERMINAL AND TRANSMISSION METHOD

(71) Applicant: NTT DOCOMO, INC., Tokyo (JP)

(72) Inventors: Tomoya Ohara, Tokyo (JP); Hideaki Takahashi, Tokyo (JP); Akihito Hanaki, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 315 days.

(21) Appl. No.: 17/754,283

(22) PCT Filed: Oct. 1, 2019

(86) PCT No.: PCT/JP2019/038807
§ 371 (c)(1),
(2) Date: Mar. 29, 2022

(87) PCT Pub. No.: WO2021/064875
PCT Pub. Date: Apr. 8, 2021

(65) Prior Publication Data
US 2022/0338272 A1    Oct. 20, 2022

(51) Int. Cl.
*H04W 72/0446* (2023.01)
*H04W 74/08* (2024.01)
*H04W 74/0833* (2024.01)

(52) U.S. Cl.
CPC ... *H04W 74/0841* (2013.01); *H04W 72/0446* (2013.01); *H04W 74/0866* (2013.01)

(58) Field of Classification Search
CPC ..... H04L 27/2601; H04L 1/00; H04L 12/189; H04L 5/0055; H04L 12/1886;
(Continued)

(56) References Cited

U.S. PATENT DOCUMENTS 10,893,543 B2 * 1/2021 Li ............................ H04W 72/23
11,903,022 B2 * 2/2024 Islam ................. H04W 74/0833
(Continued)

FOREIGN PATENT DOCUMENTS

CN          108696938 A     10/2018
WO    WO-2018110857 A1 *  6/2018   ........... H04B 7/0617

OTHER PUBLICATIONS

3GPP TS 38.211 V15.6.0 "3rd Generation Partnership Project; Technical Specification Group Radio Access Network; NR; Physical channels and modulation (Release 15)" Jun. 2019 (97 pages).
(Continued)

*Primary Examiner* — Nathan S Taylor
(74) *Attorney, Agent, or Firm* — Osha Bergman Watanabe & Burton LLP

(57) ABSTRACT

A terminal includes a receiver that receives an index that specifies configuration information for transmitting a random access preamble; and a controller that configures, when the receiver receives additional information that specifies a time domain resource for transmitting the random access preamble and the index falls within a specific numerical range, the time domain resource specified by the additional information, the time domain resource being configured by replacing a time domain resource for transmitting the random access preamble included in the configuration information specified by the index with the time domain resource specified by the additional information.

5 Claims, 22 Drawing Sheets

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | – | – | 0 |
| 1 | 0 | 8 | 1 | 9 | 0 | – | – | 0 |
| 2 | 0 | 4 | 1 | 9 | 0 | – | – | 0 |
| 3 | 0 | 2 | 0 | 9 | 0 | – | – | 0 |
| 4 | 0 | 2 | 1 | 9 | 0 | – | – | 0 |
| 5 | 0 | 2 | 0 | 4 | 0 | – | – | 0 |
| 6 | 0 | 2 | 1 | 4 | 0 | – | – | 0 |
| ... | ... | ... | ... | ... | ... | ... | ... | ... |

(58) Field of Classification Search
CPC ..... H04L 5/0042; H04L 61/5069; H04L 5/00;
H04W 28/0268; H04W 28/10; H04W
76/10; H04W 80/02; H04W 76/12; H04W
28/02; H04W 80/10; H04W 76/20; H04W
4/40; H04W 4/46; H04W 4/44; H04W
40/22; H04W 40/248; H04W 40/24;
H04W 4/06; H04W 16/28; H04W 28/04;
H04W 28/18; H04W 72/0446; H04W
74/006; H04W 74/008; H04W 74/0833;
H04W 74/0841; H04W 74/0866; H04W
74/0891; H04W 72/04; H04W 74/08;
B60W 60/001; B60W 60/00; G05D 1/02;
G01S 5/14; G01S 5/06
See application file for complete search history.

(56) References Cited

U.S. PATENT DOCUMENTS

| | | | | |
|---|---|---|---|---|
| 2018/0167980 | A1* | 6/2018 | Shi | H04W 72/51 |
| 2019/0132882 | A1* | 5/2019 | Li | H04W 74/0833 |
| 2019/0313447 | A1* | 10/2019 | Islam | H04W 74/002 |
| 2019/0342874 | A1* | 11/2019 | Davydov | H04W 72/23 |
| 2020/0068616 | A1* | 2/2020 | Qian | H04B 7/0695 |
| 2020/0154377 | A1* | 5/2020 | Qian | H04W 74/0833 |
| 2020/0229197 | A1* | 7/2020 | Geng | H04W 74/006 |
| 2020/0314816 | A1* | 10/2020 | Yi | H04L 5/0094 |
| 2020/0367145 | A1* | 11/2020 | Zhang | H04W 48/18 |
| 2020/0396633 | A1* | 12/2020 | Tseng | H04W 76/27 |
| 2021/0022180 | A1* | 1/2021 | Lei | H04L 5/10 |
| 2021/0105851 | A1* | 4/2021 | Kim | H04W 76/27 |
| 2021/0250990 | A1* | 8/2021 | Kong | H04W 56/0045 |
| 2022/0007431 | A1* | 1/2022 | Qiu | H04W 74/006 |
| 2022/0086774 | A1* | 3/2022 | Qian | H04W 72/0446 |
| 2022/0159746 | A1* | 5/2022 | Ko | H04L 5/0007 |
| 2022/0295589 | A1* | 9/2022 | Tsai | H04B 17/309 |

OTHER PUBLICATIONS

3GPP TS 36.211 V15.6.0 "3rd Generation Partnership Project; Technical Specification Group Radio Access Network; Evolved Universal Terrestrial Radio Access (E-UTRA); Physical channels and modulation (Release 15)" Jun. 2019 (239 pages).
3GPP TSG-RAN WG2 Meeting #103; R2-1813303 "Periodicity of TDD configurations [N102]" Nokia, Nokia Shanghai Bell; Gothenburg, Sweden; Aug. 20-24, 2018 (5 pages).
3GPP TSG-RAN WG2 Meeting NR Adhoc 1807; R2-1810963 "LS on additional TDD configuration periodicities" TSG RAN WG2; Montreal, Canada; Jul. 2-6, 2018 (1 page).
3GPP TSG RAN WG2#103; R2-1813279 "Response LS on additional TDD configuration periodicities" TSG RAN WG1; Gothenburg, Sweden; Aug. 20-24, 2018 (1 page).
International Search Report issued in International Application No. PCT/JP2019/038807, mailed Mar. 24, 2020 (3 pages).
Written Opinion issued in International Application No. PCT/JP2019/038807; Dated Mar. 24, 2020 (3 pages).
Extended European Search Report issued in counterpart European Patent Application No. 19947783.7, mailed on Apr. 4, 2023 (11 pages).
NTT Docomo, Inc.; "Remaining details on PRACH formats"; 3GPP TSG RAN WG1 Meeting #91, R1-1721044; Reno, USA; Nov. 27-Dec. 1, 2017 (20 pages).
ZTE, Sanechips; "Discussion on backhaul RACH resources configuration"; 3GPP TSG RAN WG1 Meeting #96, R1-1902142; Athens, Greece; Feb. 25-Mar. 1, 2019 (3 pages).
Office Action issued in counterpart Japanese Patent Application No. 2021-550822 mailed on Jul. 4, 2023 (6 pages).
3GPP TS 38.211 V15.7.0 "3rd Generation Partnership Project; Technical Specification Group Radio Access Network; NR; Physical channels and modulation (Release 15)" Sep. 2019 (97 pages).

* cited by examiner

FIG.3

| PRACH Configuration Index | Preamble format | $n_{SFN} \mod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | - | - | 0 |
| 1 | 0 | 8 | 1 | 9 | 0 | - | - | 0 |
| 2 | 0 | 4 | 1 | 9 | 0 | - | - | 0 |
| 3 | 0 | 2 | 0 | 9 | 0 | - | - | 0 |
| 4 | 0 | 2 | 1 | 9 | 0 | - | - | 0 |
| 5 | 0 | 2 | 0 | 4 | 0 | - | - | 0 |
| 6 | 0 | 2 | 1 | 4 | 0 | - | - | 0 |
| ... | ... | ... | ... | ... | ... | ... | ... | ... |

FIG.4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG.5

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 (or 2 or 7, if configured by *prach-Subframe* via RRC) | 0 | – | – | 0 |
| 1 | 0 | 8 | 1 | 9 (or 2 or 7, if configured by *prach-Subframe* via RRC) | 0 | – | – | 0 |
| 2 | 0 | 4 | 1 | 9 (or 2 or 7, if configured by *prach-Subframe* via RRC) | 0 | – | – | 0 |
| 3 | 0 | 2 | 0 | 9 (or 2 or 7, if configured by *prach-Subframe* via RRC) | 0 | – | – | 0 |
| 4 | 0 | 2 | 1 | 9 (or 2 or 7, if configured by *prach-Subframe* via RRC) | 0 | – | – | 0 |
| 5 | 0 | 2 | 0 | 4 (or 2 or 7, if configured by *prach-Subframe* via RRC) | 0 | – | – | 0 |
| 6 | 0 | 2 | 1 | 4 (or 2 or 7, if configured by *prach-Subframe* via RRC) | 0 | – | – | 0 |
| ... | ... | ... | ... | ... | ... | ... | ... | ... |

FIG.6

*RACH-ConfigGeneric* information element

```
-- ASN1START
-- TAG-RACH-CONFIGGENERIC-START

RACH-ConfigGeneric ::=           SEQUENCE {
    prach-ConfigurationIndex         INTEGER (0..255),
    msg1-FDM                         ENUMERATED {one, two, four, eight},
    msg1-FrequencyStart              INTEGER (0..maxNrofPhysicalResourceBlocks-1),
    zeroCorrelationZoneConfig        INTEGER(0..15),
    preambleReceivedTargetPower      INTEGER (-202..-60),
    preambleTransMax                 ENUMERATED {n3, n4, n5, n6, n7, n8, n10, n20, n50, n100, n200},
    powerRampingStep                 ENUMERATED {dB0, dB2, dB4, dB6},
    ra-ResponseWindow                ENUMERATED {sl1, sl2, sl4, sl8, sl10, sl20, sl40, sl80},
    ...,
    [[
    prach-Subframe-r16               ENUMERATED {sf2, sf7}
        OPTIONAL   -- Need S
    ]]
}

-- TAG-RACH-CONFIGGENERIC-STOP
-- ASN1STOP
```

*RACH-ConfigGeneric* field descriptions

*prach-Subframe*
Subframe number of random access configurations, see Tables 6.3.3.2-2 to 6.3.3.2-4 in TS 38.211 [16]. If this field is present, the UE shall use the subframe number indicate by this field to the random access configurations indicated by *prach-ConfigurationIndex*. Otherwise, the UE uses the subframe number defined for the corresponding random access configurations indicated by *prach-ConfigurationIndex*, as defined in Tables 6.3.3.2-2 to 6.3.3.2-4 in TS 38.211 [16].

FIG. 7

- 6.3.3.2   Mapping to physical resources

The preamble sequence shall be mapped to physical resources according to $$a_k^{(p,RA)} = \beta_{PRACH} y_{u,v}(k)$$
$$k = 0,1,\ldots,L_{RA}-1$$

where $\beta_{PRACH}$ is an amplitude scaling factor in order to conform to the transmit power specified in [5, TS 38.213], and $p = 4000$ is the antenna port. Baseband signal generation shall be done according to clause 5.3 using the parameters in Table 6.3.3.1-1 or Table 6.3.3.1-2 with $\bar{K}$ given by Table 6.3.3.2-1.

Random access preambles can only be transmitted in the time resources given by the higher-layer parameter *prach-ConfigurationIndex* or *prach-ConfigurationIndexAlt* according to Tables 6.3.3.2-2 to 6.3.3.2-4 and depends on FR1 or FR2 and the spectrum type as defined in [8, TS 38.104]. If the time resource is given by *prach-ConfigurationIndexAlt*, the subframe number is provided by the higher-layer parameter *prach-Subframe*. For the unpaired spectrum, random access preambles can be transmitted if the time resources given by *prach-ConfigurationIndex* or *prach-ConfigurationIndexAlt* plus *prach-Subframe* coincide with the UL resources given by *TDD-UL-DL-ConfigCommon* and *TDD-UL-DL-ConfigDedicated*.

FIG. 8

| PRACH Configuration Index | Preamble format | $n_{SFN} \mod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 (or 2 or 7, if prach-SubframeOffset is provided via RRC) | 0 | 1 | 1 | 0 |
| 1 | 0 | 8 | 1 | 9 (or 2 or 7, if prach-SubframeOffset is provided via RRC) | 0 | 1 | 1 | 0 |
| 2 | 0 | 4 | 1 | 9 (or 2 or 7, if prach-SubframeOffset is provided via RRC) | 0 | 1 | 1 | 0 |
| 3 | 0 | 2 | 0 | 9 (or 2 or 7, if prach-SubframeOffset is provided via RRC) | 0 | 1 | 1 | 0 |
| 4 | 0 | 2 | 1 | 9 (or 2 or 7, if prach-SubframeOffset is provided via RRC) | 0 | 1 | 1 | 0 |
| 5 | 0 | 2 | 0 | 4 (or 2 or 7, if prach-SubframeOffset is provided via RRC) | 0 | 1 | 1 | 0 |
| 6 | 0 | 2 | 1 | 4 (or 2 or 7, if prach-SubframeOffset is provided via RRC) | 0 | 1 | 1 | 0 |
| ... | ... | ... | ... | ... | ... | ... | ... | ... |

FIG.9

*RACH-ConfigGeneric* information element

```
-- TAG-RACH-CONFIGGENERIC-START

RACH-ConfigGeneric ::=         SEQUENCE {
    prach-ConfigurationIndex       INTEGER (0..255),
    msg1-FDM                       ENUMERATED {one, two, four, eight},
    msg1-FrequencyStart            INTEGER (0..maxNrofPhysicalResourceBlocks-1),
    zeroCorrelationZoneConfig      INTEGER (0..15),
    preambleReceivedTargetPower    INTEGER (-202..-60),
    preambleTransMax               ENUMERATED {n3, n4, n5, n6, n7, n8, n10, n20, n50, n100, n200},
    powerRampingStep               ENUMERATED {dB0, dB2, dB4, dB6},
    ra-ResponseWindow              ENUMERATED {sl1, sl2, sl4, sl8, sl10, sl20, sl40, sl80},
    ...,
    [[
    prach-SubframeOffset-r16       INTEGER (1..9)
        OPTIONAL  -- Need S
    ]]
}

-- TAG-RACH-CONFIGGENERIC-STOP
-- ASN1STOP
```

*RACH-ConfigGeneric* field descriptions

| |
|---|
| *prach-SubframeOffset*<br>Subframe number offset of random access configurations, see Tables 6.3.3.2-2 to 6.3.3.2-4 in TS 38.211 [16]. If this field is present, the subframe number is derived as (subframe number as indicated by *prach-ConfigurationIndex* plus *prach-SubframeOffset*) mod 10. Otherwise, the UE uses the subframe number defined for the corresponding random access configurations indicated by *prach-ConfigurationIndex*, as defined in Tables 6.3.3.2-2 to 6.3.3.2-4 in TS 38.211 [16]. |

FIG.10

- 6.3.3.2 Mapping to physical resources

The preamble sequence shall be mapped to physical resources according to $$a_k^{(p,RA)} = \beta_{PRACH} y_{u,v}(k)$$
$$k = 0,1,\ldots,L_{RA} -1$$

where $\beta_{PRACH}$ is an amplitude scaling factor in order to conform to the transmit power specified in [5, TS 38.213], and $p = 4000$ is the antenna port. Baseband signal generation shall be done according to clause 5.3 using the parameters in Table 6.3.3.1-1 or Table 6.3.3.1-2 with $\bar{k}$ given by Table 6.3.3.1-2.

Random access preambles can only be transmitted in the time resources given by the higher-layer parameter *prach-ConfigurationIndex* according to Tables 6.3.3.2-2 to 6.3.3.2-4 and depends on FR1 or FR2 and the spectrum type as defined in [8, TS 38.104]. If the higher-layer parameter *prach-SubframeOffset* is provided, the UE determines the subframe number by [(Subframe number in Table 6.3.3.2-2 to 6.3.3.2-4 + *prach-SubframeOffset*) mod 10]. For the unpaired spectrum, random access preambles can be transmitted if the time resources given by *prach-ConfigurationIndex* (and *prach-SubframeOffset*) coincide with the UL resources given by *TDD-UL-DL-ConfigCommon* and *TDD-UL-DL-ConfigDedicated*.

FIG. 11

*RACH-ConfigGeneric* information element

```
-- ASN1START
-- TAG-RACH-CONFIGGENERIC-START

RACH-ConfigGeneric ::=           SEQUENCE {
    prach-ConfigurationIndex           INTEGER (0..255),
    msg1-FDM                           ENUMERATED {one, two, four, eight},
    msg1-FrequencyStart                INTEGER (0..maxNrofPhysicalResourceBlocks-1),
    zeroCorrelationZoneConfig          INTEGER(0..15),
    preambleReceivedTargetPower        INTEGER (-202..-60),
    preambleTransMax                   ENUMERATED {n3, n4, n5, n6, n7, n8, n10, n20, n50, n100, n200},
    powerRampingStep                   ENUMERATED {dB0, dB2, dB4, dB6},
    ra-ResponseWindow                  ENUMERATED {sl1, sl2, sl4, sl8, sl10, sl20, sl40, sl80},
    ...,
    [[
    prach-ConfigurationIndexAlt-r16    INTEGER (0..255)
        OPTIONAL,    -- Need S
    prach-Subframe-r16                 ENUMERATED {sf2, sf7}
        OPTIONAL     -- Need S
    ]]
}

-- TAG-RACH-CONFIGGENERIC-STOP
-- ASN1STOP
```

*RACH-ConfigGeneric* field descriptions

*prach-ConfigurationIndexAlt*
Alternative PRACH configuration index. For *prach-ConfigurationIndex* configured under *beamFailureRecovery-Config*, the *prach-ConfigurationIndex* can only correspond to the short preamble format, (see TS 38.211 [16], clause 6.3.3.2). If this field is present, the UE shall use the random access configurations indicated by this field. Otherwise, the UE uses the random access configurations indicated by *prach-ConfigurationIndex*.

*prach-Subframe*
Subframe number of random access configurations, see Tables 6.3.3.2-2 to 6.3.3.2-4 in TS 38.211 [16]. If this field is present, the UE shall use the subframe number indicate by this field to the random access configurations indicated by *prach-ConfigurationIndexAlt*. Otherwise, the UE uses the subframe number defined for the corresponding random access configurations indicated by *prach-ConfigurationIndex*, as defined in Tables 6.3.3.2-2 to 6.3.3.2-4 in TS 38.211 [16]. This field is mandatory present, if *prach-ConfigurationIndexAlt* is present.

FIG.12

6.3.3.2     Mapping to physical resources

The preamble sequence shall be mapped to physical resources according to $$a_k^{(p,RA)} = \beta_{PRACH} y_{u,v}(k)$$
$$k = 0,1,...,L_{RA}-1$$

where $\beta_{PRACH}$ is an amplitude scaling factor in order to conform to the transmit power specified in [5, TS38.213], and $p = 4000$ is the antenna port. Baseband signal generation shall be done according to clause 5.3 using the parameters in Table 6.3.3.1-1 or Table 6.3.3.1-2 with $\tilde{k}$ given by Table 6.3.2-1.

Random access preambles can only be transmitted in the time resources given by the higher-layer parameter *prach-ConfigurationIndex* or *prach-ConfigurationIndexAlt* according to Tables 6.3.3.2-2 to 6.3.3.2-4 and depends on FR1 or FR2 and the spectrum type as defined in [8, TS38.104]. If the time resource is given by *prach-ConfigurationIndexAlt*, the subframe number is provided by the higher-layer parameter *prach-Subframe*. For the unpaired spectrum, random access preambles can be transmitted if the time resources given by *prach-ConfigurationIndex* or *prach-ConfigurationIndexAlt* plus *prach-Subframe* coincide with the UL resources given by *TDD-UL-DL-ConfigCommon* and *TDD-UL-DL-ConfigDedicated*.

FIG. 13

*RACH-ConfigGeneric* information element

```
-- ASN1START
-- TAG-RACH-CONFIGGENERIC-START

RACH-ConfigGeneric ::=         SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax                ENUMERATED {n3, n4, n5, n6, n7, n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...,
    [[
    prach-ConfigurationIndexAlt-r16    INTEGER (0..255)
        OPTIONAL,  -- Need S
    prach-SubframeOffset-r16           INTEGER (1..9)
        OPTIONAL  -- Need S
    ]]
}

-- TAG-RACH-CONFIGGENERIC-STOP
-- ASN1STOP
```

*RACH-ConfigGeneric* field descriptions

*prach-ConfigurationIndexAlt*
Alternative PRACH configuration index. For *prach-ConfigurationIndex* configured under *beamFailureRecovery-Config*, the *prach-ConfigurationIndex* can only correspond to the short preamble format, (see TS 38.211 [16], clause 6.3.3.2). If this field is present, the UE shall use the random access configurations indicated by this field. Otherwise, the UE uses the random access configurations indicated by *prach-ConfigurationIndex*.

*prach-SubframeOffset*
Subframe number offset of random access configurations, see Tables 6.3.3.2-2 to 6.3.3.2-4 in TS 38.211 [16]. If this field is present, the subframe number is derived as (subframe number as indicated by prach-ConfigurationIndex plus prach-SubframeOffset) mod 10. Otherwise, the UE uses the subframe number defined for the corresponding random access configurations indicated by *prach-ConfigurationIndex*, as defined in Tables 6.3.3.2-2 to 6.3.3.2-4 in TS 38.211 [16]. This field is mandatory present, if prach-ConfigurationIndexAlt is present.

FIG. 14

6.3.3.2  Mapping to physical resources

The preamble sequence shall be mapped to physical resources according to $$a_k^{(p,RA)} = \beta_{PRACH} y_{u,v}(k)$$
$$k = 0, 1, ..., L_{RA} - 1$$

where $\beta_{PRACH}$ is an amplitude scaling factor in order to conform to the transmit power specified in [5, TS38.213], and $p = 4000$ is the antenna port. Baseband signal generation shall be done according to clause 5.3 using the parameters in Table 6.3.3.1-1 or Table 6.3.3.1-2 with $\bar{k}$ given by Table 6.3.3.1-2.

Random access preambles can only be transmitted in the time resources given by the higher-layer parameter *prach-ConfigurationIndex* or *prach-ConfigurationIndexAlt* according to Tables 6.3.3.2-2 to 6.3.3.2-4 and depends on FR1 or FR2 and the spectrum type as defined in [8, TS38.104]. If the time resource is given by *prach-ConfigurationIndexAlt*, an offset of subframe number is provided by the higher-layer parameter *prach-SubframeOffset*. The UE determines the subframe number by (Subframe number in Table 6.3.3.2-2 to 6.3.3.2-4 – *prach-SubframeOffset*) mod 10]. For the unpaired spectrum, random access preambles can be transmitted if the time resources given by *prach-ConfigurationIndex* or *prach-ConfigurationIndexAlt* plus *prach-SubframeOffset* coincide with the UL resources given by *TDD-UL-DL-ConfigCommon* and *TDD-UL-DL-ConfigDedicated*.

FIG.15

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | 1 | 1 | 0 |
| 1 | 0 | 8 | 1 | 9 | 0 | 1 | 1 | 0 |
| 2 | 0 | 4 | 1 | 9 | 0 | 1 | 1 | 0 |
| 3 | 0 | 2 | 0 | 9 | 0 | 1 | 1 | 0 |
| 4 | 0 | 2 | 1 | 9 | 0 | 1 | 1 | 0 |
| 5 | 0 | 2 | 0 | 4 | 0 | 1 | 1 | 0 |
| 6 | 0 | 2 | 1 | 4 | 0 | 1 | 1 | 0 |
| ... | ... | ... | ... | ... | ... | ... | ... | ... |
| 256 | 0 | 16 | 1 | 2 | 0 | 1 | 1 | 0 |
| 257 | 0 | 8 | 1 | 2 | 0 | 1 | 1 | 0 |
| 258 | 0 | 4 | 1 | 2 | 0 | 1 | 1 | 0 |
| 259 | 0 | 2 | 0 | 2 | 0 | 1 | 1 | 0 |
| 260 | 0 | 2 | 1 | 2 | 0 | 1 | 1 | 0 |
| 261 | 0 | 2 | 0 | 2 | 0 | 1 | 1 | 0 |
| 262 | 0 | 2 | 1 | 2 | 0 | 1 | 1 | 0 |
| 263 | 0 | 16 | 1 | 7 | 0 | 1 | 1 | 0 |
| 264 | 0 | 8 | 1 | 7 | 0 | 1 | 1 | 0 |
| 265 | 0 | 4 | 1 | 7 | 0 | 1 | 1 | 0 |
| 266 | 0 | 2 | 0 | 7 | 0 | 1 | 1 | 0 |
| 267 | 0 | 2 | 1 | 7 | 0 | 1 | 1 | 0 |
| 268 | 0 | 2 | 0 | 7 | 0 | 1 | 1 | 0 |
| 269 | 0 | 2 | 1 | 7 | 0 | 1 | 1 | 0 |
| 270 | Reserved | | | | | | | |
| 271 | Reserved | | | | | | | |

FIG.16

*RACH-ConfigGeneric information element*

```
-- ASN1START
-- TAG-RACH-CONFIGGENERIC-START

RACH-ConfigGeneric ::=              SEQUENCE {
    prach-ConfigurationIndex            INTEGER (0..255),
    msg1-FDM                            ENUMERATED {one, two, four, eight},
    msg1-FrequencyStart                 INTEGER (0..maxNrofPhysicalResourceBlocks-1),
    zeroCorrelationZoneConfig           INTEGER(0..15),
    preambleReceivedTargetPower         INTEGER (-202..-60),
    preambleTransMax                    ENUMERATED {n3, n4, n5, n6, n7, n8, n10, n20, n50, n100, n200},
    powerRampingStep                    ENUMERATED {dB0, dB2, dB4, dB6},
    ra-ResponseWindow                   ENUMERATED {sl1, sl2, sl4, sl8, sl10, sl20, sl40, sl80},
    ...,
    [[
    prach-ConfigurationIndex-v16xy      INTEGER (256..271)
        OPTIONAL,  -- Need S
    ]]
}

-- TAG-RACH-CONFIGGENERIC-STOP
-- ASN1STOP
```

| *RACH-ConfigGeneric* field descriptions |
|---|
| *prach-ConfigurationIndex, prach-ConfigurationIndex-v16xy*<br>PRACH configuration index. For prach-ConfigurationIndex configured under beamFailureRecovery-Config, the prach-ConfigurationIndex can only correspond to the short preamble format, (see TS 38.211 [16], clause 6.3.3.2). |

FIG.17

- ...
- 6.3.3.2 Mapping to physical resources

The preamble sequence shall be mapped to physical resources according to $$a_k^{(p,RA)} = \beta_{PRACH} y_{u,v}(k)$$
$$k = 0,1,\ldots,L_{RA}-1$$

where $\beta_{PRACH}$ is an amplitude scaling factor in order to conform to the transmit power specified in [5, TS38.213], and $p = 4000$ is the antenna port. Baseband signal generation shall be done according to clause 5.3 using the parameters in Table 6.3.3.1-1 or Table 6.3.3.1-2 with $\bar{k}$ given by Table 6.3.3.2-1.

Random access preambles can only be transmitted in the time resources given by the higher-layer parameter *prach-ConfigurationIndex* according to Tables 6.3.3.2-2 to 6.3.3.2-4 and depends on FR1 or FR2 and the spectrum type as defined in [8, TS38.104]. For the unpaired spectrum, random access preambles can be transmitted if the time resources given by *prach-ConfigurationIndex* coincide with the UL resources given by *TDD-UL-DL-ConfigCommon* and *TDD-UL-DL-ConfigDedicated*.

FIG. 18

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 2 | 0 | – | – | 0 |
| 1 | 0 | 8 | 1 | 2 | 0 | – | – | 0 |
| 2 | 0 | 4 | 1 | 2 | 0 | – | – | 0 |
| 3 | 0 | 2 | 0 | 2 | 0 | – | – | 0 |
| 4 | 0 | 2 | 1 | 2 | 0 | – | – | 0 |
| 5 | 0 | 2 | 0 | 2 | 0 | – | – | 0 |
| 6 | 0 | 2 | 1 | 2 | 0 | – | – | 0 |
| 7 | 0 | 16 | 1 | 7 | 0 | – | – | 0 |
| 8 | 0 | 8 | 1 | 7 | 0 | – | – | 0 |
| 9 | 0 | 4 | 1 | 7 | 0 | – | – | 0 |
| 10 | 0 | 2 | 0 | 7 | 0 | – | – | 0 |
| 11 | 0 | 2 | 1 | 7 | 0 | – | – | 0 |
| 12 | 0 | 2 | 0 | 7 | 0 | – | – | 0 |
| 13 | 0 | 2 | 1 | 7 | 0 | – | – | 0 |
| 14 | Reserved | | | | | | | |
| 15 | Reserved | | | | | | | |

FIG.19

*RACH-ConfigGeneric* information element

```
-- ASN1START
-- TAG-RACH-CONFIGGENERIC-START

RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax                ENUMERATED {n3, n4, n5, n6, n7, n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...,
    [[
    prach-ConfigurationIndexAlt-r16   INTEGER (0..6)
    OPTIONAL,   -- Need S
    ]]
}

-- TAG-RACH-CONFIGGENERIC-STOP
-- ASN1STOP
```

| *RACH-ConfigGeneric* field descriptions |
|---|
| *prach-ConfigurationIndex* <br> PRACH configuration index. For *prach-ConfigurationIndex* configured under *beamFailureRecovery-Config*, the *prach-ConfigurationIndex* can only correspond to the short preamble format. (see TS 38.211 [16] clause 6.3.3.2). |
| *prach-ConfigurationIndexAlt* <br> Alternative PRACH configuration index for FR1 and unpaired spectrum as specified in Table 6.3.3.2-3a of TS 38.211. This field is used for the case where subframe number of 2 or 7 is applied for the periodicity of 20, 40, 80 and 160 ms. For *prach-ConfigurationIndex* configured under *beamFailureRecovery-Config*, the *prach-ConfigurationIndex* can only correspond to the short preamble format. (see TS 38.211 [16] clause 6.3.3.2). If this field is absent, the UE shall use the PRACH configuration indicated by *prach-ConfigurationIndex*. |

FIG.20

6.3.3.2  Mapping to physical resources

The preamble sequence shall be mapped to physical resources according to $$a_k^{(p,RA)} = \beta_{PRACH} y_{u,v}(k)$$

$$k = 0,1,\ldots,L_{RA}-1$$

where $\beta_{PRACH}$ is an amplitude scaling factor in order to conform to the transmit power specified in [5, TS38.213], and $p = 4000$ is the antenna port. Baseband signal generation shall be done according to clause 5.3 using the parameters in Table 6.3.3.1-1 or Table 6.3.3.1-2 with $\bar{k}$ given by Table 6.3.2-1.

Random access preambles can only be transmitted in the time resources given by the higher-layer parameter *prach-ConfigurationIndex* or *prach-ConfigurationIndex.lt* according to Tables 6.3.3.2-2 to 6.3.3.2-4 and depends on FR1 or FR2 and the spectrum type as defined in [8, TS38.104]. For the unpaired spectrum, random access preambles can be transmitted if the time resources given by *prach-ConfigurationIndex* or *prach-ConfigurationIndex.lt* coincide with the UL resources given by *TDD-UL-DL-ConfigCommon* and *TDD-UL-DL-ConfigDedicated*.

TERMINAL AND TRANSMISSION METHOD

TECHNICAL FIELD

The present invention relates to a terminal and a transmission method in a radio communication system.

BACKGROUND ART

In 3rd Generation Partnership Project (3GPP), a radio communication system called New Radio (NR) or 5G has been studied to achieve a further increase in a system capacity, a further increase in a data transmission rate, and further reduction of latency in a radio section. In order to achieve a throughput that is greater than or equal to 10 Gbps, while meeting the requirement that the latency in the radio section is reduced to be less than or equal to 1 ms, various types of radio technology have been studied.

At the time at which the Release 15 specifications were fixed, the dl-UL-TransmissionPeriodicity of the TDD-UL-DL-pattern was 0.5 ms, 0.625 ms, 1 ms, 1.25 ms, 2 ms, 2.5 ms, 5 ms, or 10 ms. In this regard, in order to allow synchronization with DL/UL switching timings of LTE TDD configurations 1, 2, and 4, as the dl-UL-TransmissionPeriodicity, 3 ms and 4 ms are added to the specifications subsequent to those of September, 2018.

RELATED ART DOCUMENT

Non-Patent Document

Non-Patent Document 1: 3GPP TS38.211 V15.6.0 (2019-06)
Non-Patent Document 2: 3GPP TS36.211 V15.6.0 (2019-06)
Non-Patent Document 3: 3GPP TSG-RAN WG2 Meeting #103, R2-1813303, Gothenburg, Sweden, 20-24 Aug. 2018
Non-Patent Document 4: 3GPP TSG-RAN WG2 Meeting NR Adhoc 1807, R2-1810963, Montreal, Canada, 2-6 Jul. 2018
Non-Patent Document 5: 3GPP TSG-RAN WG2 #103, R2-1813279, Gothenburg, Sweden, 20-24 Aug. 2018

SUMMARY OF THE INVENTION

Problem to be Solved by the Invention

Spectrum sharing between the LTE system and the NR system has been assumed, i.e., a common frequency band has been assumed to be used in the LTE system and the NR system. When timings of radio frames are aligned between the LTE TDD system and the NR TDD system, and communications are performed using a common frequency band, it is necessary to suppress interference caused by one communication system on the other communication system. For example, if an LTE TDD subframe is assigned to a downlink at a timing and an NR TDD subframe is assigned to an uplink at the timing, the NR uplink transmission may cause significant interference on the LTE downlink reception.

There is a need for a method of suppressing interference caused by a terminal on another system when the terminal transmits a random access preamble.

Means for Solving the Problem

According to an aspect of the present invention, there is provided a terminal including a receiver that receives an index that specifies configuration information for transmitting a random access preamble; and a controller that configures, when the receiver receives additional information that specifies a time domain resource for transmitting the random access preamble and the index falls within a specific numerical range, the time domain resource specified by the additional information, the time domain resource being configured by replacing a time domain resource for transmitting the random access preamble included in the configuration information specified by the index with the time domain resource specified by the additional information.

Advantage of the Invention

According to an embodiment of the present invention, there is provided a method of suppressing interference caused by a terminal on another system when the terminal transmits a random access preamble.

BRIEF DESCRIPTION OF DRAWINGS

FIG. 3 is a diagram illustrating an example of a random access configuration table.
FIG. 4 is a diagram illustrating an example of an Uplink-downlink configuration for an LTE TDD system.
FIG. 5 is a diagram illustrating an example of Proposal 1.
FIG. 6 is a diagram illustrating an example of a RACH-ConfigGeneric information element.
FIG. 7 is a diagram illustrating a modified example of a specification corresponding to Proposal 1.
FIG. 8 is a diagram illustrating an example of Proposal 2.
FIG. 9 is a diagram illustrating an example of a RACH-ConfigGeneric information element.
FIG. 10 is a diagram illustrating a modified example of a specification corresponding to Proposal 2.
FIG. 11 is a diagram illustrating an example of a RACH-ConfigGeneric information element.
FIG. 12 is a diagram illustrating a modified example of a specification corresponding to Proposal 3.
FIG. 13 is a diagram illustrating an example of a RACH-ConfigGeneric information element.
FIG. 14 is a diagram illustrating a modified example of a specification corresponding to Proposal 4.
FIG. 15 is a diagram illustrating an example of Proposal 5.
FIG. 16 is a diagram illustrating an example of a RACH-ConfigGeneric information element.
FIG. 17 is a diagram illustrating a modified example of a specification corresponding to Proposal 5.
FIG. 18 is a diagram illustrating an example of Proposal 6.
FIG. 19 is a diagram illustrating an example of a RACH-ConfigGeneric information element.
FIG. 20 is a diagram illustrating a modified example of a specifications corresponding to Proposal 6.

EMBODIMENTS OF THE INVENTION

In the following, embodiments of the present invention (the embodiments) are described with reference to the drawings. The embodiments described below are merely examples, and embodiments to which the present invention is applied are not limited to the following embodiments.

The radio communication system according to the following embodiments is assumed to basically conform to NR, but this is an example, and an entire radio communication system or a part of the radio communication system according to the embodiments may conform to a radio communication system other than NR (e.g., LTE).

(Overall System Configuration)

Figure 1:
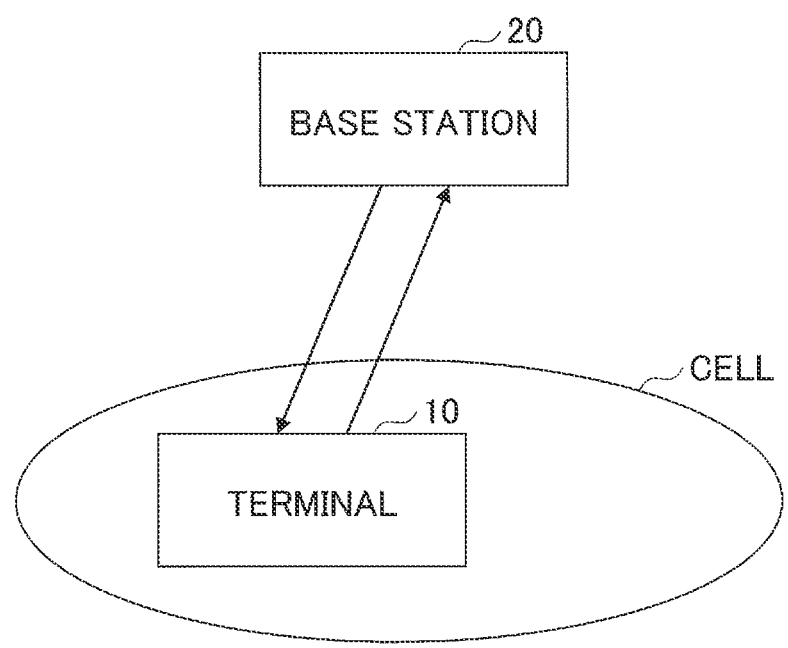
FIG. 1 is a diagram illustrating a configuration of a communication system according to an embodiment.

FIG. 1 is a configuration diagram of the radio communication system according to an embodiment. The radio communication system according to the embodiment includes a terminal (user equipment) 10 and a base station 20 as illustrated in FIG. 1. In FIG. 1, one terminal 10 and one base station 20 are indicated, but this is an example and there may be two or more terminals 10 and two or more base stations 20.

The terminal 10 is a communication device having a radio communication function, such as a smartphone, a cellular phone, a tablet, a wearable terminal, and a communication module for M2M (Machine-to-Machine). The terminal 10 wirelessly connects to the base station 20 and utilizes various communication services provided by the radio communication system. The base station 20 is a communication device that provides one or more cells and wirelessly communicates with the terminal 10. The terminal 10 and the base station 20 are capable of beam forming to transmit and receive signals. The terminal 10 may also be referred to as a UE and the base station 20 may be referred to as an eNB.

In an embodiment, a duplex method may be a TDD (Time Division Duplex) method or a FDD (Frequency Division Duplex) method.

The technology according to an embodiment relates to a random access procedure or the like. Accordingly, first, these operation examples in the radio communication system are described.

(Random Access Procedures)

Figure 2:
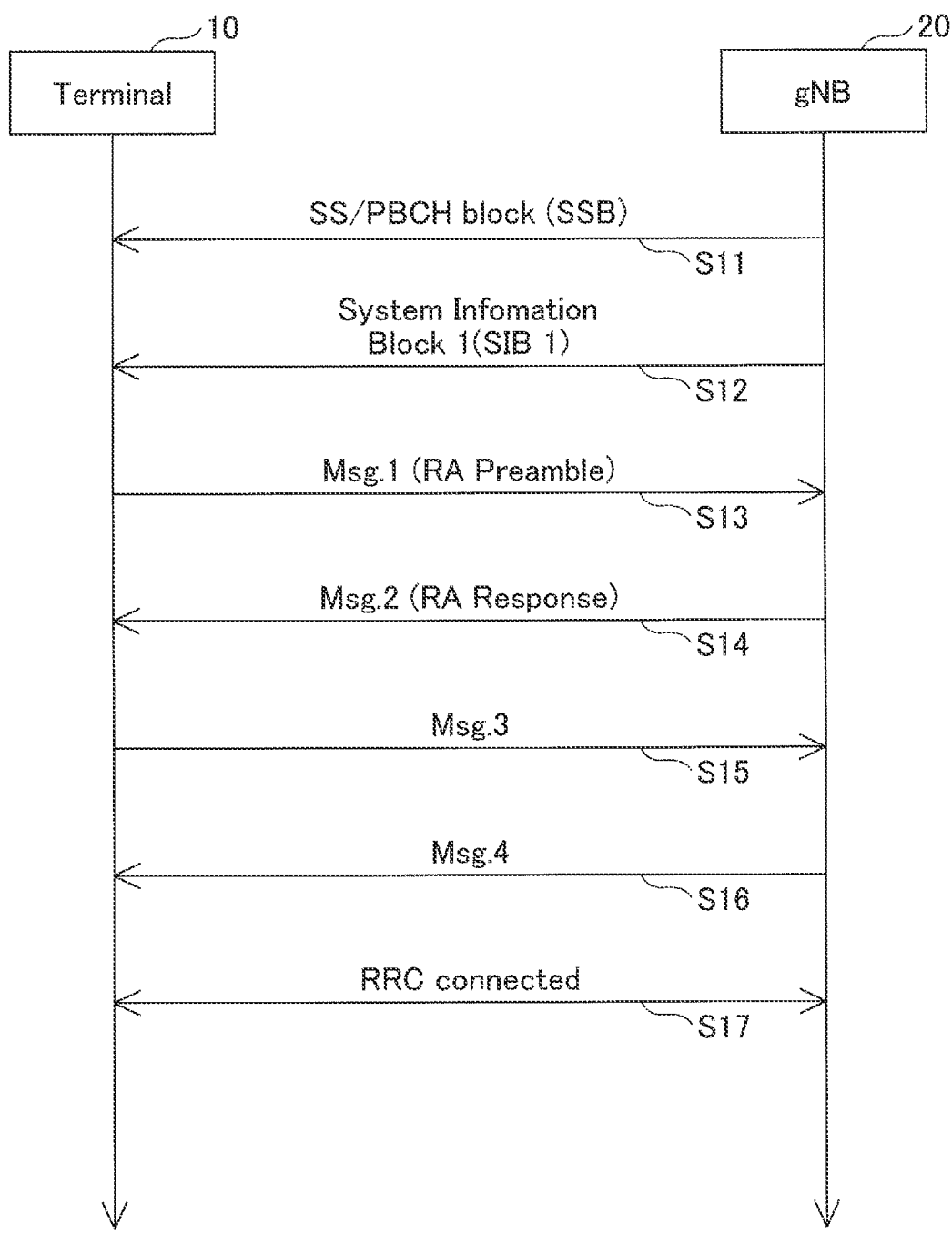
FIG. 2 is a diagram illustrating an example of a random access procedure.

Referring to FIG. 2, an example of a random access procedure according to this embodiment is described. The procedure illustrated in FIG. 2 may also be referred to as an initial access.

The base station 20 transmits a Synchronization Signals and Physical Broadcast Channel (SS/PBCH) block (also called SSB) at a predetermined period, and the terminal 10 receives the SS/PBCH block (S11). The SS/PBCH block includes a synchronization signal, a part of system information required for an initial access (a system frame number (SFN), information required to read remaining system information, etc.). The terminal 10 receives a System Information Block 1 (SIB1) from the base station 20 (S12).

Subsequently, the terminal 10 transmits Message1 (Msg1 (=RA preamble)) (S13).

In response to detecting an RA preamble, the base station 20 transmits a response, i.e., a Message2 (Msg2 (=RA response)) to the terminal 10 (S14). In the following description, "Msg2" includes a Physical Downlink Control Channel (PDCCH) used for scheduling and a Physical Downlink Shared Channel (PSDCH) for transmitting main body information.

In response to receiving the RA response, the terminal 10 transmits a Message3 (Msg3) including predetermined information to the base station 20 (step S15). For example, a Message 3 is an RRC connection request.

In response to receiving the Message 3, the base station 20 transmits a Message4 (Msg4, e.g., RRC connection setup) to the terminal 10 (S16). Upon detecting that the above-described predetermined information is included in the Message4, the terminal 10 determines that the Message4 corresponds to the above-described Message3 and the Message4 is addressed to the terminal 10, the terminal 10 completes the random access procedure, and the terminal 10 establishes an RRC connection (S17). Note that FIG. 2 illustrates an example of a case in which the Message3 and Message4 are transmitted. However, this is merely an example. The technique according to an embodiment can be applied to a random access procedure in which a Message3 and a Message4 are not transmitted.

As for a transmission occasion of a random access preamble, it is specified in Non-Patent Document 1 that a random access preamble can be transmitted only during the time resource specified by a higher layer parameter prach-ConfigIndex.

FIG. 3 is a diagram illustrating an example of a table of a random access configurations specified by a prach-ConfigIndex for a Frequency Range (FR) 1 and a TDD.

For example, suppose that a value 0 is transmitted from the base station 20 to the terminal 10, as a PRACH Configuration Index. In this case, in response to receiving the value 0 as the PRACH Configuration Index, the terminal 10 can detect that a preamble format is 0; periodicity of a transmission occasion of a random access preamble is 160 ms; and a transmission occasion of a random access preamble is the subframe 9 among subframes 0 to 9 included in a radio frame of 10 ms.

The $n_{SFN}$ mod x=y illustrated in FIG. 3 specifies a radio frame number that includes a transmission occasion of a random access preamble. For example, when x=16 and y=1, transmission occasions of a random access preamble are radio frames with system frame number (SFN)=1, 17, 33, . . . . Because the duration of one radio frame is 10 ms, when x=16 and y=1, the periodicity of transmission occasions of a random access preamble is 160 ms. In the example of FIG. 3, when the value of the PRACH Configuration Index is 1, the periodicity of transmission occasions of a random access preamble is 80 ms; when the value of the PRACH Configuration Index is 2, the periodicity of transmission occasions of a random access preamble is 40 ms; and when the value of the PRACH Configuration Index is any of 3 to 6, the periodicity of transmission occasions of a random access preamble is 20 ms.

FIG. 4 is a diagram illustrating an example of an Uplink-downlink configuration for the time division duplex (TDD) method of LTE. In the example illustrated in FIG. 4, 10 subframes are included in a radio frame of 10 ms, and each subframe is a downlink subframe (indicated as D), an uplink subframe (indicated as U), or a special subframe (indicated as S).

At the time at which the 3GPP Release 15 specifications were fixed, the dl-UL-TransmissionPeriodicity of TDD-UL-DL-pattern was 0.5 ms, 0.625 ms, 1 ms, 1.25 ms, 2 ms, 2.5 ms, 5 ms, or 10 ms.

In this regard, in order to allow synchronization with DL/UL switching timings of LTE TDD configurations 1, 2, and 4, as the dl-UL-TransmissionPeriodicity, 3 ms and 4 ms are added to the specifications subsequent to those of September, 2018. As described above, it is assumed that a radio frame timing of the LTE TDD system is aligned with a radio frame timing of the NR TDD system. Furthermore, spectrum sharing between the LTE system and the NR system has been assumed, i.e., a common frequency band has been assumed to be used in the LTE system and the NR system.

When timings of radio frames are aligned between the LTE TDD system and the NR TDD system, and communications are performed using a common frequency band, it is necessary to suppress interference caused by one communication system on the other communication system. For example, if an LTE TDD subframe is assigned to a downlink at a timing and an NR TDD subframe is assigned to an uplink at the timing, the NR uplink transmission may cause significant interference on the LTE downlink reception. Accordingly, when the LTE TDD system and the NR TDD system are used in a common frequency band, it is assumed that an LTE TDD subframe and an NR TDD subframe at a timing that is the same as the LTE TDD subframe are assigned for uplink, or downlink.

Here, suppose that a timing of a radio frame of the LTE TDD system is aligned with a timing of a radio frame of the NR TDD system and that spectrum sharing is performed between the LTE system and NR system. Furthermore, suppose that, in the LTE system, 2 is configured as the Uplink-downlink configuration illustrated in FIG. 4. In this case, among the radio frames of the LTE system, the subframes assigned to uplink are subframe 2 and subframe 7.

Accordingly, when the terminal 10 transmits a random access preamble in the NR system, it is assumed that the terminal 10 transmits the random access preambles in the subframe 2 and/or the subframe 7.

However, according to the table illustrated in FIG. 3, when the PRACH Configuration Index is any one of 0 to 6, subframes for transmitting a random access preamble are 9 and 4, and it is not assumed that subframes 2 and 7 are to be specified.

There is a need for a method of allowing the terminal 10 in the NR system to transmit a random access preamble at a timing of a subframe that is specified for uplink in the LTE system.

(Proposal 1)

FIG. 5 is a diagram illustrating an example of Proposal 1. In the method of Proposal 1, the table that specifies the random access configurations illustrated in FIG. 3 is used as is (the table illustrated in FIG. 3 itself is not changed). For example, the base station 20 notifies the terminal 10 of any index among the PRACH Configuration Indexes 0-6 of the table illustrated in FIG. 3. Furthermore, the base station 20 notifies the terminal 10 of the subframe number specifying the random access preamble transmission occasion by RRC signaling. The terminal 10 does not apply the subframe number specified in the table illustrated in FIG. 3, but applies the subframe number received from the base station 20 as a transmission occasion of a random access preamble.

For example, the base station 20 transmits a value 0 as the PRACH Configuration Index to the terminal 10. Furthermore, the base station 20 notifies the terminal 10, for example, that the subframe number specifying a random access preamble transmission occasion is 7. The terminal 10 receives the value 0 as the PRACH Configuration Index and configures the subframe 7 as a subframe capable of transmitting a random access preamble in response to receiving the subframe number 7 specifying a random access preamble transmission occasion. In this case, the radio frame in which a random access preamble can be transmitted is SFN=1, 17, 33, . . . . That is, the terminal 10 configures 160 ms, as the periodicity of transmission occasions of a random access preamble.

FIG. 6 is a diagram illustrating an example of a RACH-ConfigGeneric information element that can be used by the base station 20 to notify the terminal 10 of a subframe number specifying a random access preamble transmission occasion. The value of the field prach-Subframe included in the RACH-ConfigGeneric information element illustrated in FIG. 6 may specify a subframe number of a subframe in which a random access preamble can be transmitted. FIG. 7 is a diagram illustrating a modified example of the specification corresponding to Proposal 1.

(Proposal 2)

FIG. 8 is a diagram illustrating an example of Proposal 2. In the method of Proposal 2, the table specifying the random access configurations illustrated in FIG. 3 is used without any modification (the table illustrated in FIG. 3 itself is not changed). For example, the base station 20 notifies the terminal 10 of any index among the PRACH Configuration Indexes 0-6 of the table illustrated in FIG. 3. Furthermore, the base station 20 notifies the terminal 10 of the offset between a subframe number specified in the table of FIG. 3 and a subframe number of a subframe that is actually capable of transmitting a random access preamble by RRC signaling. The terminal 10 sets a number obtained by applying the modulo 10 calculation to the value obtained by adding the offset value to the subframe number specified in the table illustrated in FIG. 3, as the subframe number of the subframe capable of transmitting a random access preamble.

For example, the base station 20 transmits a value 0 as the PRACH Configuration Index to the terminal 10. Furthermore, the base station 20 notifies the terminal 10 of 8 by RRC signaling, as an offset value between a subframe number specified in the table of FIG. 3 and a subframe number of a subframe in which a random access preamble can actually be transmitted. The terminal 10 receives the value 0 as the PRACH Configuration Index and, in response to receiving 8 as the offset value between the subframe number specified in the table of FIG. 3 and the subframe number of the subframe in which a random access preamble can be actually transmitted, calculates (9+8) mod 10=7 and sets the subframe 7 as a subframe in which a random access preamble can be transmitted. In this case, the radio frames in which a random access preamble can be transmitted are SFN=1, 17, 33, . . . . That is, the terminal 10 sets 160 ms, as the periodicity of transmission occasions of a random access preamble.

FIG. 9 is a diagram illustrating an example of a RACH-ConfigGeneric information element that can be used by the base station 20 for notifying the terminal 10 of an offset between a subframe number specified in the table of FIG. 3 and a subframe number of a subframe in which a random access preamble can be actually transmitted. The values of the field prach-Subframe included in the RACH-ConfigGeneric information element illustrated in FIG. 9 may specify the offset between the subframe number specified in the table in FIG. 3 and the subframe number of the subframe that is actually capable of transmitting random access preambles. FIG. 10 is a diagram illustrating a modified example of the specification corresponding to Proposal 2.

(Proposal 3)

When the base station 20 attempts to configure any one of the PRACH Configuration Indexes 0-6 illustrated in FIG. 3 for the terminal 10, for example, a PRACH Configuration IndexAlt may be defined, as an index that is different from the PRACH Configuration Index illustrated in FIG. 3, while assuming a case in which only a subframe number is set to 2 or 7, instead of 4 or 9. The base station 20 may set any value from 0 to 6 as the PRACH Configuration IndexAlt and notify the terminal 10 of the PRACH Configuration IndexAlt by RRC signaling. Additionally, the base station 20 may notify the terminal 10 of a subframe number 2 or 7 by RRC signaling. In this case, for example, it is possible to set only the subframe number of the subframe in which the random access preamble can be transmitted to 2 or 7, instead of 4 or 9, while configuring a random access resource corresponding to any one of the PRACH Configuration Indexes 0-6 illustrated in FIG. 3 without changing the table of FIG. 3 itself. As described above, when the new parameter PRACH Configuration IndexAlt is defined, a legacy terminal does not read the PRACH Configuration IndexAlt but reads only the PRACH Configuration Index. Accordingly, it is possible to apply different PRACH Configuration Indexes to the legacy terminal and the terminal 10 that supports the method of Proposed 3, respectively, and the legacy terminal and the terminal 10 supporting the method of Proposal 3 can coexist.

FIG. 11 is a diagram illustrating an example of a RACH-ConfigGeneric information element that can be used by the base station 20 for notifying the terminal 10 of the PRACH Configuration IndexAlt and the subframe number. By setting the value of the field prach-ConfigurationIndexAlt included in the RACH-ConfigGeneric information element illustrated in FIG. 11 to any value from 0 to 6 and setting the subframe number (the value of the field prach-Subframe in FIG. 11) to 2 or 7, the base station 20 can set, to the terminal 10, only the subframe number to 2 or 7, instead of 9, while configuring a random access configuration corresponding to any one of the PRACH Configuration Indexes 0 to 6 illustrated in FIG. 3 for the terminal 10. That is, upon receiving the PRACH-ConfigGeneric information element, the terminal 10 determines whether the field of prach-ConfigurationIndexAlt is included. In response to detecting that the PRACH-ConfigGeneric information element includes a prach-ConfigurationIndexAlt field, the terminal 10 obtains any value from 0 to 6 set in the prach-ConfigurationIndexAlt field, and obtains 2 or 7, as a subframe number. As a result, the terminal 10 can configure a random access resource corresponding to the PRACH Configuration Index corresponding to the value set in the prach-ConfigurationIndexAlt field while setting 2 or 7 as the subframe number of the subframe in which a random access preamble can be transmitted. FIG. 12 is a diagram illustrating a modified example a specification corresponding to Proposal 3.

(Proposal 4)

When the base station 20 attempts to set any of the PRACH Configuration Indexes 0-6 illustrated in FIG. 3 to the terminal 10, for example, a PRACH Configuration IndexAlt may be defined, as an index that is different from the PRACH Configuration Index illustrated in FIG. 3, while assuming a case in which only a subframe number is set to 2 or 7, instead of 4 or 9. The base station 20 may set any value of the values from 0 to 6 as the PRACH Configuration IndexAlt and notify the terminal 10 of the PRACH Configuration IndexAlt by RRC signaling. Additionally, the base station 20 notifies the terminal 10 of the offset between the subframe number specified in the table of FIG. 3 and the subframe number of the subframe that is actually capable of transmitting the random access preamble by RRC signaling. In this case, it is possible to set only the subframe number of the subframe in which the random access preamble can be transmitted to 2 or 7 instead of 4 or 9 while configuring a random access resource corresponding to any one of the PRACH Configuration Indexes 0-6 illustrated in FIG. 3, without changing the table in FIG. 3 itself. As described above, when the new parameter PRACH Configuration IndexAlt is defined, the legacy terminal does not read the PRACH Configuration IndexAlt but reads only the PRACH Configuration Index. Accordingly, it is possible to apply different PRACH Configuration Indexes to the legacy terminal and the terminal 10 supporting the method of Proposed 3. The legacy terminal and the terminal 10 supporting the method of Proposed 3 can coexist.

FIG. 13 is a diagram illustrating an example of a RACH-ConfigGeneric information element that can be used by the base station 20 for notifying the terminal 10 of the PRACH Configuration IndexAlt and the subframe number. By setting the value of the field prach-ConfigurationIndexAlt included in the RACH-ConfigGeneric information element illustrated in FIG. 11 to any value from 0 to 6 and setting the offset value of the subframe number (the value of the field prach-SubframeOffset illustrated in FIG. 13) to 3 or 8, the base station 20 can set only the subframe number to 2 or 7 instead of 4 or 9 while configuring a random access configuration corresponding to any one of the PRACH Configuration Indexes 0 to 6 illustrated in FIG. 3 to the terminal 10. Upon receiving the PRACH-ConfigGeneric information element, the terminal 10 determines whether a prach-ConfigurationIndexAlt field is included. In response to detecting that the PRACH-ConfigurationIndexAlt field is included in the PRACH-ConfigGeneric information element, the terminal 10 obtains a value from 0 to 6 set in the prach-ConfigurationIndexAlt field, and in response to receiving 3 or 8 as the offset value of the subframe number, calculates (3+9) mod 10=2 or (8+9) mod 10=7 (or (3+4) mod 10=7 or (8+4) mod 10=2), and sets the subframe 2 or 7 as a subframe capable of transmitting a random access preamble. FIG. 14 is a diagram illustrating a modified example of the specification corresponding to Proposal 4.

(Proposal 5)

The random access configuration table for the FR1 and TDD illustrated in FIG. 3 may be extended to include a PRACH Configuration Index corresponding to any of the PRACH Configuration Indexes 0-6 illustrated in FIG. 3, while only the subframe number is modified to be 2 or 7, instead of 4 or 9. FIG. 15 is a diagram illustrating an example of Proposed 5. In the table illustrated in FIG. 15, 256 to 271 are added as PRACH Configuration Indexes, and by any one of Indexes 256 to 269, a random access configuration corresponding to any one of PRACH Configuration Indexes 0 to 6 while only the subframe number is modified to be 2 or 7, instead of 4 or 9. An extension may also be made so that the base station 20 can transmit the PRACH Configuration Index that is a value greater than or equal to 256 in the RACH-ConfigGeneric information element that can be used to notify the terminal 10 of the PRACH Configuration Index.

FIG. 16 is a diagram illustrating an example of a RACH-ConfigGeneric information element that can be used by the base station 20 to notify the terminal 10 of the PRACH Configuration Index. By using the prach-ConfigurationIndex-v16xy field included in the RACH-ConfigGeneric information element illustrated in FIG. 16, a notification of the PRACH Configuration Index with a value that is greater than or equal to 256 can be transmitted. FIG. 17 is a diagram illustrating a modified example of the specification corresponding to Proposal 5.

(Proposal 6)

FIG. 18 is a diagram illustrating an example of Proposal 6. In the method of Proposal 6, a table is newly defined that corresponds to the table for specifying a random access configuration illustrated in FIG. 3 and that can specify a subframe number 2 or 7, as a subframe in which a random access preamble can be transmitted. In the table illustrated in FIG. 18, indexes 0 to 6 corresponding to the PRACH Configuration Indexes illustrated in FIG. 3 and capable of specifying subframe number 2, and indexes 7 to 13 corresponding to the PRACH Configuration Indexes illustrated in FIG. 3 and capable of specifying subframe number 7 are defined.

FIG. 19 is a diagram illustrating an example of a RACH-ConfigGeneric information element that can be used by the base station 20 for notifying the PRACH Configuration Index to the terminal 10. By using the field prach-ConfigurationIndexAlt included in the RACH-ConfigGeneric information element illustrated in FIG. 19, a notification of a PRACH Configuration Index that corresponds to the PRACH Configuration Index illustrated in FIG. 3 and that can specify a subframe number 2 or 7 can be transmitted. FIG. 20 is a diagram illustrating a modified example of the specification corresponding to Proposal 6.

As described in the above embodiments, an NR time domain resource specified by a PRACH Configuration Index, which is capable of transmitting a random access preamble, may only be enabled if the timing matches the timing of an LTE UL transmission resource for unpaired spectrum (TDD).

The UE capability corresponding to the above-described extensions of Proposal 1 to Proposal 6 may be specified. As for the terminal 10 in a connected mode, e.g., the terminal 10 supporting EN-DC, a RACH-ConfigGeneric based on any one of Proposal 1 to Proposal 6 may be set to the terminal 10 based on the UE capability.

Note that, in the above-described methods of Proposal 1 to Proposal 6, for all the entries in the RACH configuration table (table specifying random access configurations), an offset to be applied to a subframe number or the like is indicated. In this case, the modification affects all the entries in the RACH configuration table (there are 256 indexes in one table), and an impact on the implementation of the terminal may be large.

(Proposal 7)

For a RACH configuration table, an offset applied to a subframe number may be newly indicated by RRC. In this case, applicable entries and/or tables may be limited.

For example, the terminal 10 may only apply an offset to be applied to a subframe number to a specific entry (e.g., entries with indexes 0-6) in the RACH configuration table.

The terminal 10 may also use an existing table as a RACH configuration table or a table that is indicated separately by RRC. Even if a table is used which is indicated separately by the RRC, the terminal 10 may only apply an offset to be applied to a subframe number to a specific entry in the RACH configuration table indicated by the RRC.

(Proposal 8)

A part of parameters indicated to the terminal 10 by the RACH configuration table may be overwritten or modified by indicating separately by RRC. In this case, the terminal 10 may limit applicable entries and/or tables for the part of the parameters separately indicated by RRC.

The above-described part of the parameters may be, for example, a preamble format, a RACH configuration period (the period indicated as x in the RACH configuration table), a SFN arranged in the RACH configuration period (a system frame number indicated as y in the RACH configuration table), a subframe number (the subframe number), a starting symbol in one slot (starting symbol), a number of PRACH slots in a subframe (number of PRACH slots within a subframe), a number of PRACH occasions in the time domain in the PRACH slot, a PRACH duration, or the like.

For example, if x=2 is indicated to the terminal 10 in another RRC signaling, the terminal 10 may overwrite the value of x by x=2, and transmit PRACH, even if the value of x specified by the RACH configuration index is 1.

A value of a parameter that can be indicated for overwriting or modifying may be all the available values that can be indicated. Alternatively, a value of a parameter that can be indicated for overwriting or modifying may be limited by a technical specification to a subset of the available values that can be indicated.

For example, the terminal 10 may only apply a value of a parameter indicated for overwriting or modifying to indexes 0-6 of the RACH configuration table.

(Proposal 9)

The terminal 10 may report whether an indicated offset value can be applied to a subframe number in the RACH configuration table, as UE capability. Additionally or alternatively, tables and/or entries to which an indicated offset value is applicable (i.e., the range to which the offset value is applicable) may be defined, and the terminal 10 may transmit the table and/or entry to which the indicated offset value is applicable, as UE capability.

For example, three or more patterns may be specified: the indicated offset value cannot be applied to the subframe number of the RACH configuration table; the indicated offset value can be applied to a subframe number of a part of entries in the RACH configuration table; and the indicated offset value can be applied to subframe numbers of all the entries in the RACH configuration table. The terminal 10 may transmit any of the three or more patterns.

In a non-stand-alone (NSA), i.e., when the LTE is used as a primary cell group and the NR is used as a secondary cell group, a connection between the terminal 10 and the LTE system is established prior to transmitting an initial PRACH to the NR system. Accordingly, the terminal 10 can transmit the UE capability to the network side, before an initial PRACH transmission. Accordingly, the above-described UE capability may be UE capability limited only to the NSA terminal 10. Alternatively, the above-described UE capability may be UE capability for both the stand-alone (SA) terminal 10 and the NSA terminal 10. When the above-described UE capability is applied to the SA terminal 10, application of the above-described UE capability may be excluded for an initial access before the transmission of UE capability.

(Proposal 10)

The terminal 10 may signal whether a function can be applied that is for overwriting or modifying a corresponding part of parameters in a RACH configuration table by the part of the parameters of the PRACH configuration table separately signaled by RRC, as UE capability. Additionally or alternatively, a table and/or an entry (i.e., a range that can be overwritten or modified) may be defined that can be overwritten or modified by a part of parameters of a RACH configuration table separately signaled by RRC, and the terminal 10 may signal, as UE capability, the table and/or the entry that can be overwritten or modified by the part of parameters of the RACH configuration table separately signaled by RRC.

For example, three or more patterns may be specified: a function for overwriting or modifying a corresponding part of parameters of a RACH configuration table by the part of the parameters of the RACH configuration table cannot be applied; a corresponding part of parameters of a part of entries of a RACH configuration table can be overwritten or modified by the part of the parameter of the RACH configuration table that is separately signaled by RRC; or a corresponding part of parameters of all the entries of a RACH configuration table can be overwritten or modified by the part of the parameter of the RACH configuration table separately signaled by RRC. The terminal may signal any pattern of the three or more patterns.

The above-described UE capability may be UE capability limited only to the NSA terminal 10. Alternatively, the above-described UE capability may be UE capability for both the stand-alone (SA) terminal 10 and the NSA terminal 10. When the above-described UE capability is applied to the SA terminal 10, application of the above-described UE capability may be excluded for an initial access prior to the signaling of UE capability.

(Proposal 11)

Details of a part of entries of an existing RACH configuration table may be modified (e.g., the details may be modified by a definition in a specification).

For example, for entries of index 0 through 6 in the RACH configuration table, the subframe number may be changed to 2 and/or 7.

Alternatively, for example, 2 and/or 7 may be added to the existing subframe number for the entries of indexes 0-6 of the RACH configuration table (table specifying random access configurations) illustrated in FIG. 3. Here, since there is a rule to invalidate a RACH resource that overlaps with a Downlink (DL) domain, a resource other than the assumed RACH resource is invalidated.

For example, in the RACH configuration table (table for specifying random access configurations) illustrated in FIG. 3, the subframe number may be changed to 7, or 7 may be added (the subframe number is 7, or 7 and 9) for the entries of the indexes 0 to 4 (the subframe number is 9 in these entries). Furthermore, the subframe number may be changed to 2, or 2 may be added (the subframe number is 2, or 2 and 4) to the entries of the indexes 5 to 6 of the RACH configuration table (in these entries, the subframe number is 4).

The above-described existing RACH configuration table may be, for example, a RACH configuration table of 3GPP Release 15. The RACH configuration table obtained by modifying details of a part of entries of the existing RACH configuration table may be the RACH configuration table of 3GPP Release 16, or a RACH configuration table of a Release subsequent to 3GPP Release 16.

The base station 20 may signal, to the terminal 10, whether to use the RACH configuration table of 3GPP Release 15 or the RACH configuration table of 3GPP Release 16 (or the RACH configuration table of a Release subsequent to 3GPP Release 16) (e.g., it may be signaled by a 1-bit RRC signaling).

Furthermore, UE capability may be defined to indicate that a RACH configuration table of 3GPP Release 16 (or a Release subsequent to 3GPP Release 16) can be used, and the terminal 10 may signal the above-described UE capability.

The above-described UE capability may be UE capability limited only to the NSA terminal 10. Alternatively, the above-described UE capability may be UE capability for both the stand-alone (SA) terminal 10 and the NSA terminal 10. When the above-described UE capability is applied to the SA terminal 10, application of the above-described UE capability may be excluded for an initial access prior to the signaling of UE capability.

According to the above-described embodiments, when the timings of TDD UL DL configurations are matched between the LTE TDD system and the NR TDD system, the system of the NR can support any RACH periodicity of 20 ms, 40 ms, 80 ms, and 160 ms.

(Device Configuration)

Next, a functional configuration example of the base station 20 and the terminal 10 for performing the processes and operations described above is described. The base station 20 and the terminal 10 include functions for implementing the above-described embodiments. However, each of the base station 20 and the terminal 10 may include only a part of the functions in the embodiments. The terminal 10 and the base station 20 may be collectively referred to as a communication device.

<User Equipment>

Figure 21:
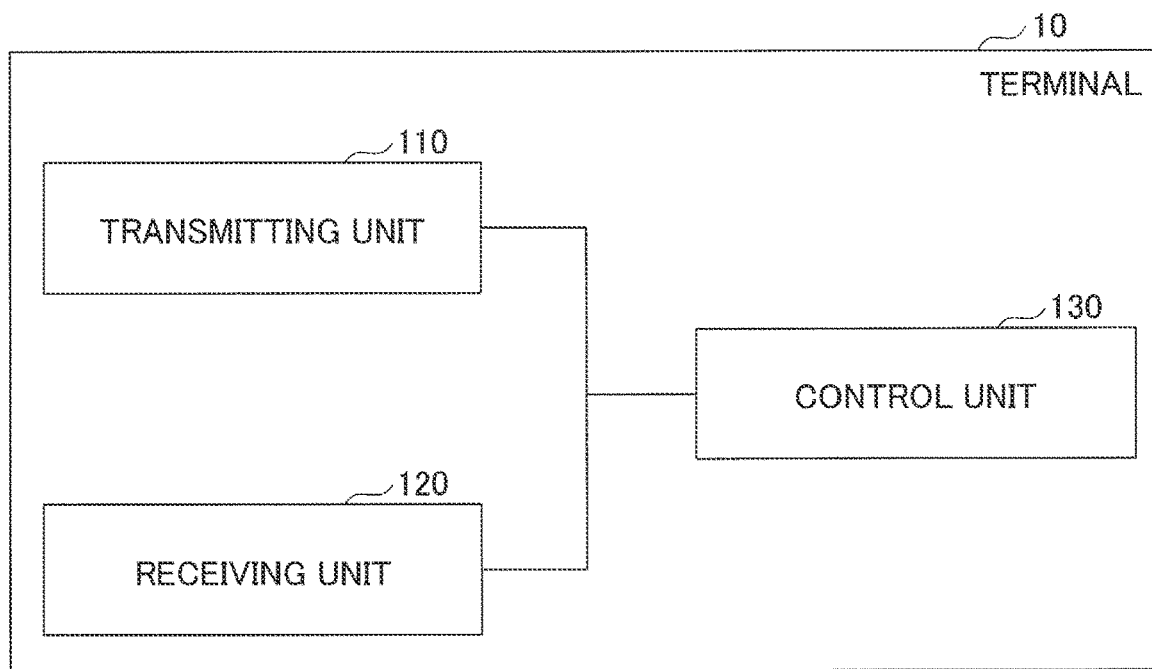
FIG. 21 is a diagram illustrating an example of a functional configuration of a terminal.

FIG. 21 is a diagram illustrating an example of a functional configuration of the terminal 10. As illustrated in FIG. 21, the terminal 10 includes a transmitting unit 110, a receiving unit 120, and a control unit 130. The functional configuration illustrated in FIG. 21 is merely an example. The functional division and names of functional units may be any division and names, provided that the operation according to the embodiments can be performed. Note that the transmitting unit 110 may be referred to as a transmitter, and the receiving unit 120 may be referred to as a receiver. The transmitting unit 110 creates a transmission signal from transmission data and transmits the transmission signal through radio. The transmitting unit 110 can form one or more beams. The receiving unit 120 receives various types of signals wirelessly and obtains higher layer signals from the received physical layer signals. Furthermore, the receiving unit 120 includes a measurement unit that measures a received signal to obtain received power, etc.

The control unit 130 performs control of the terminal 10. The function of the control unit 130 related to transmission may be included in the transmitting unit 110, and the function of the control unit 130 related to reception may be included in the receiving unit 120.

For example, the receiving unit 120 of the terminal 10 receives a signal including a PRACH Configuration Index transmitted from the base station 20. The control unit 130 of the terminal 10 configures the preamble format corresponding to the value of the PRACH Configuration Index received by the receiving unit 120, periodicity of transmission occasions of a random access preamble, and a subframe number including a transmission occasion of a random access preamble. The transmitting unit 110 of the terminal 10 transmits a random access preamble to the base station 20 according to the random access configuration configured by the control unit 130.

For example, the receiving unit 120 of the terminal 10 receives a signal including the PRACH Configuration Index transmitted from the base station 20. The receiving unit 120 of the terminal 10 receives an additional signal including a subframe number specifying a transmission occasion of a random access preamble. The control unit 130 of the terminal 10 configures the preamble format corresponding to the value of the received PRACH Configuration Index and periodicity of transmission occasions of a random access preamble. However, for the transmission occasions of a random access preamble, the control unit 130 sets a subframe number specified by an additional signal received by the receiving unit 120.

For example, the receiving unit 120 of the terminal 10 receives a signal including the PRACH Configuration Index transmitted from the base station 20. The receiving unit 120 of the terminal 10 receives an additional signal including an offset between the subframe number of the subframe specified by the PRACH Configuration Index received by the receiving unit 120 and the subframe number of the subframe in which the random access preamble can be actually transmitted. The control unit 130 of the terminal 10 configures the preamble format corresponding to the value of the received PRACH Configuration Index and periodicity of transmission occasions of a random access preamble. However, for the transmission occasions of a random access preamble, the control unit 130 sets a subframe number specified by an additional signal received by the receiving unit 120.

For example, the receiving unit 120 of the terminal 10 receives a signal including an alternative PRACH Configuration Index transmitted from the base station 20. The receiving unit 120 of the terminal 10 receives an additional signal including a subframe number specifying a transmission occasion of a random access preamble. The control unit 130 of the terminal 10 configures the preamble format specified by a normal PRACH Configuration Index corresponding to the value of the alternative PRACH Configuration Index received by the receiving unit 120 and periodicity of transmission occasions of a random access preambles. However, for the transmission occasions of a random access preamble, the control unit 130 sets a subframe number specified by an additional signal received by the receiving unit 120.

For example, the receiving unit 120 of the terminal 10 receives a signal including an alternative PRACH Configuration Index transmitted from the base station 20. The receiving unit 120 of the terminal 10 receives an additional signal including an offset between the subframe number of the subframe specified by the normal PRACH Configuration Index corresponding to the value of the alternative PRACH Configuration Index received by the receiving unit 120 and the subframe number of the subframe in which a random access preamble can actually be transmitted. The control unit 130 of the terminal 10 configures a preamble format specified by the normal PRACH Configuration Index corresponding to a value of the alternative PRACH Configuration Index received by the receiving unit 120 and periodicity of transmission occasions of a random access preamble. However, for the transmission occasions of a random access preamble, the control unit 130 sets a subframe number specified by an additional signal received by the receiving unit 120.

For example, the receiving unit 120 of the terminal 10 receives a signal including an additional PRACH Configuration Index transmitted from the base station 20. In this case, the control unit 130 of the terminal 10 configures the preamble format, periodicity of transmission occasions of a random access preamble, and a subframe number as the transmission occasion of a random access preamble corresponding to the value of the PRACH Configuration Index received by the receiving unit 120.

For example, a first table including a first set of normal PRACH Configuration Indexes and a second table including a second set of PRACH Configuration Indexes corresponding to the first set of the normal PRACH Configuration Indexes, but specifying a subframe number other than those specified in the first set of the normal PRACH Configuration Indexes, as the subframe number of the subframe in which a random access preamble can be transmitted, may be defined. In this case, for example, the receiving unit 120 of the terminal 10 receives a signal including one of the PRACH Configuration Indexes of the second set transmitted from the base station 20. The controller of the terminal 10 configures the preamble format, periodicity of transmission occasions of a random access preamble, and a subframe number as a transmission occasion of a random access preamble corresponding to the value of any of the PRACH Configuration Indexes of the second set received by the receiving unit 120.

The receiving unit 120 of the terminal 10 may receive information indicating an offset applied to a subframe number, and the control unit 130 of the terminal 10 may apply the offset applied to the subframe number only to specific entries (e.g., entries with indexes 0 to 6) in the RACH configuration table.

The receiving unit 120 of the terminal 10 may receive a part of parameters signaled to the terminal 10 by the RACH configuration table through a separate RRC message. The control unit 130 of the terminal 10 may limit the applicable entries and/or tables for the part of the parameters separately signaled by RRC.

The transmitting unit 110 of the terminal 10 may signal, as UE capability, whether the signaled offset value can be applied to a subframe number of the RACH configuration table.

The transmitting unit 110 of the terminal 10 may signal, as UE capability, whether a function can be applied that is for overwriting or modifying, by a part of parameters of the RACH configuration table separately signaled by RRC, the corresponding part of the parameters of the RACH configuration table.

<Base Station 20>

Figure 22:
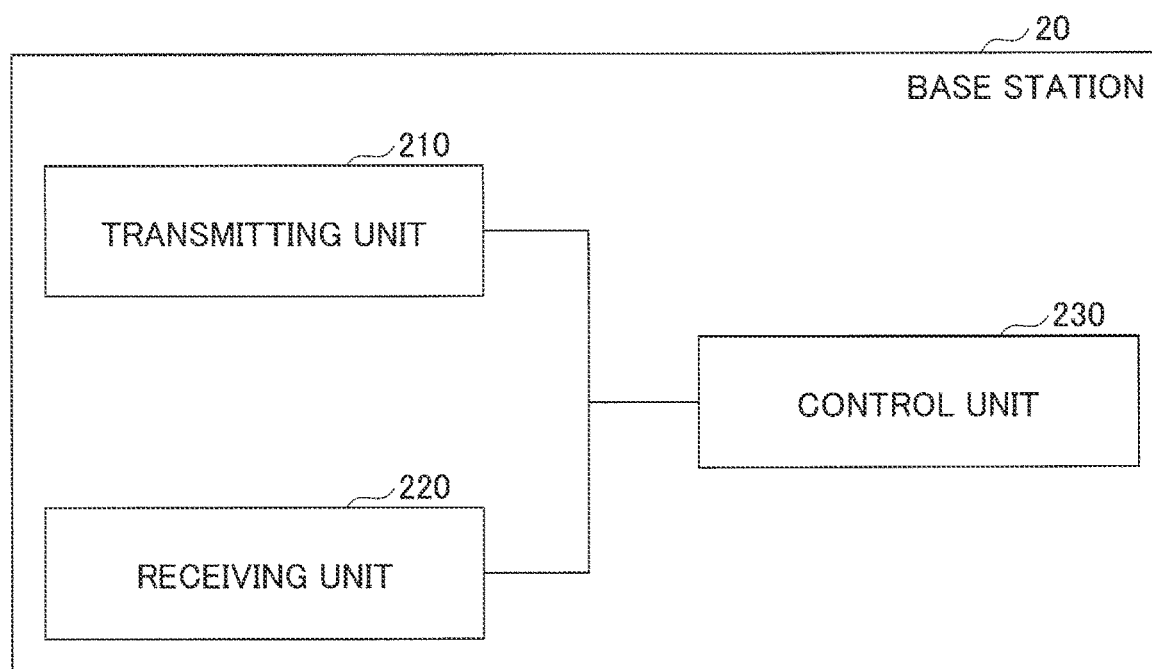
FIG. 22 is a diagram illustrating an example of a functional configuration of a base station.

FIG. 22 is a diagram illustrating an example of a functional configuration of the base station 20. As illustrated in FIG. 22, the base station 20 includes a transmitting unit 210, a receiving unit 220, and a control unit 230. The functional configuration illustrated in FIG. 22 is merely one example. The function division and the names of the functional units may be any division and names, provided that the operation according to the embodiments can be implemented. Note that the transmitting unit 210 may be referred to as a transmitter and the receiving unit 220 may be referred to as a receiver.

The transmitting unit 210 includes a function for generating a signal to be transmitted to the terminal 10 and transmitting the signal through radio. The transmitting unit 210 forms one or more beams. The receiving unit 220 includes a function for receiving various signals transmitted from the terminal 10 and obtaining, for example, information of a higher layer from the received signals. The receiving unit 220 includes a measurement unit that measures a received signal to obtain received power or the like.

The control unit 230 controls the base station 20. The function of the control unit 230 related to transmission may be included in the transmitting unit 210, and the function of the control unit 230 related to reception may be included in the receiving unit 220.

For example, the control unit 230 of the base station 20 selects a PRACH Configuration Index for specifying a random access configuration to be configured for the terminal 10. The transmitting unit 210 of the base station 20 transmits a signal including the PRACH Configuration Index selected by the control unit 230 to the terminal 10. Additionally, when a subframe number specifying a transmission occasion of a random access preamble configured by the PRACH Configuration Index to be transmitted to the terminal 10 is modified, the control unit 230 of the base station 20 generates information specifying the modified subframe number, and the transmitting unit 210 transmits a signal including information specifying the modified subframe number to the terminal 10.

<Hardware Configuration>

The block diagrams (FIG. 21 to FIG. 22) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, or the like. For example, a functional block (component) that functions to transmit is called a transmitter or a transmitter. In either case, as described above, the implementation method is not particularly limited.

Figure 23:
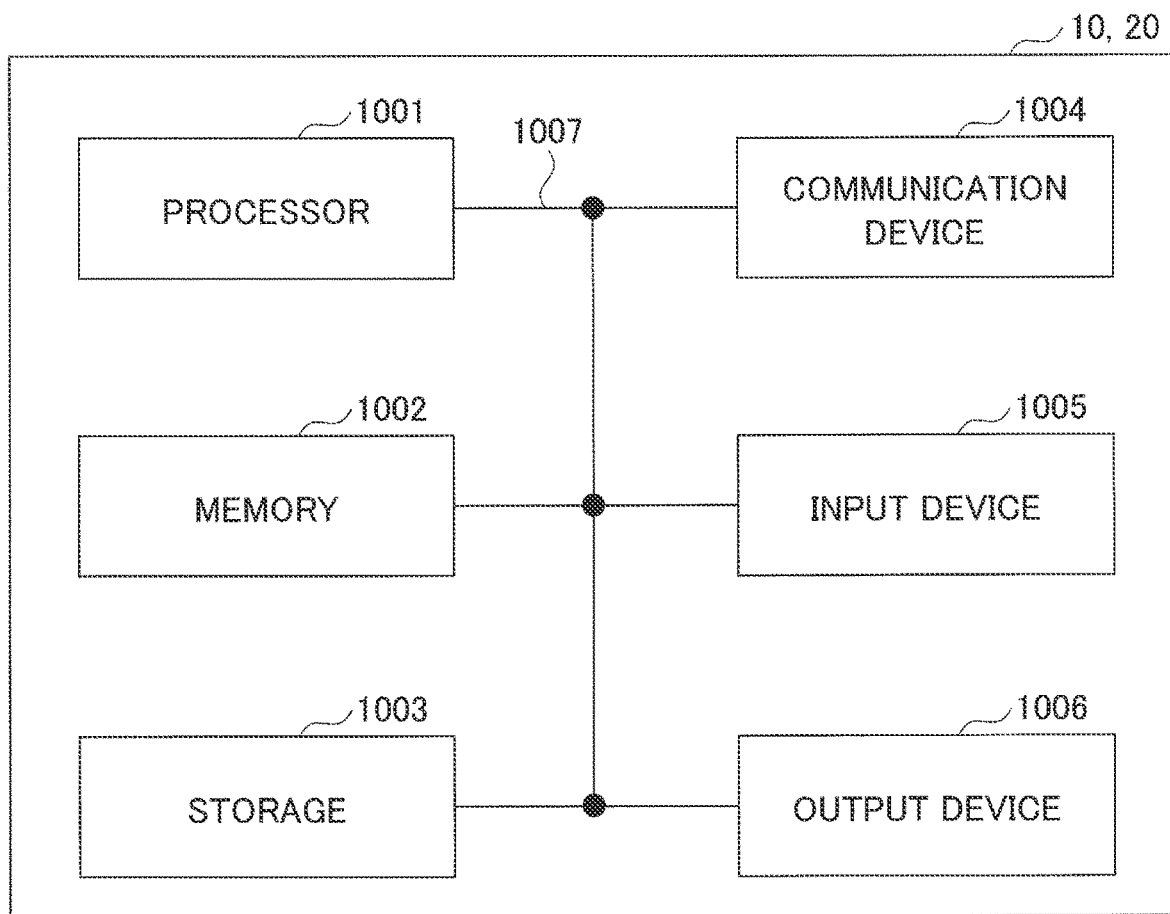
FIG. 23 is a diagram illustrating an example of a hardware configuration of a terminal and a base station.

For example, the terminal 10 and the base station 20 according to an embodiment of the present invention may function as a computer that performs processing according to the present embodiment. FIG. 23 is a diagram illustrating an example of a hardware configuration of the terminal 10 and the base station 20 according to the present embodiment. The terminal 10 and the base station 20 may each be configured as a computer device including, physically, a processor 1001, memory 1002, a storage 1003, a communication device 1004, an input device 1005, an output device 1006, a bus 1007, or the like.

In the following description, the term "device" can be replaced with a circuit, a device, a unit, or the like. The hardware configuration of the terminal 10 and base station 20 may be configured to include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, or the like.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the control unit 130 of the terminal 10 may be implemented by a control program that is stored in the memory 1002 and that is operated by the processor 1001, and other functional blocks may be similarly implemented. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a RAM (Random Access Memory), or the like. The memory 1002 may be referred to as a register, a cache, a main memory (main storage device), or the like. The memory 1002 may store a program (program code), a software module, or the like which can be executed for implementing the radio communication method according to one embodiment of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, or the like. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like to implement at least one of frequency division duplex (FDD: Frequency Division Duplex) and time division duplex (TDD: Time Division Duplex).

The input device 1005 is an input device (e.g., a keyboard, a mouse, a microphone, a switch, a button, or a sensor) that receives an external input. The output device 1006 is an output device (e.g., a display, a speaker, or LED lamp) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

The terminal 10 and base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

CONCLUSION OF THE EMBODIMENTS

In this specification, at least the terminal and the communication method described below are disclosed.

A terminal including a receiver that receives an index that specifies configuration information for transmitting a random access preamble; and a controller that configures, when the receiver receives additional information that specifies a time domain resource for transmitting the random access preamble and the index falls within a specific numerical range, the time domain resource specified by the additional information, the time domain resource being configured by replacing a time domain resource for transmitting the random access preamble included in the configuration information specified by the index with the time domain resource specified by the additional information.

According to the above-described configuration, for example, in a case where a time domain resource for transmitting a random access preamble included in default configuration information for transmitting the random access preamble overlaps a timing of a time domain resource for a downlink transmission in another system, the time domain resource for transmitting the random access preamble can be configured to be another time domain resource specified by the additional information. By matching the other time domain resource specified by the additional information with a timing of a time domain resource for an uplink transmission in another communication system, an effect of an interference on the other communication system caused by a random access preamble transmission can be reduced. Furthermore, since only the configuration information corresponding to an index in the specific numerical range in the RACH configuration tale is to be modified, an impact on the implementation of the terminal can be reduced.

The time domain resource for transmitting the random access preamble may be a resource in a unit of a subframe, and the additional information may specify one of a subframe number of a subframe for transmitting the random access preamble or an offset value between a subframe number of a subframe specified by the configuration and a subframe number of a subframe that is actually capable of transmitting the random access preamble.

According to the above-described configuration, for example, when an LTE TDD system and an NR TDD system are used in a common frequency band, by specifying a subframe for transmitting a random access preamble by the additional information, the subframe for transmitting the random access preamble can be adjusted to the timing of an LTE uplink subframe. Accordingly, an effect of an interference on the LTE communication system by the random access preamble transmission in the NR communication system can be reduced.

When the receiver receives additional information for one or more parameters in the configuration information for transmitting the random access preamble and the index falls within the specific numerical range, the controller may overwrite the one or more parameters included in the configuration information specified by the index based on the additional information.

According to the above-described configuration, only the one or more parameters in the configuration information corresponding to the index in the specific numerical range are to be modified in the RACH configuration table, so that the impact on the implementation of the terminal can be reduced.

The controller may configure capability information indicating whether one or more parameters in the configuration information for transmitting the random access preamble are capable of being modified based on separately transmitted information.

According to the above-described configuration, the terminal can transmit, to the base station, the capability information indicating whether the one or more parameters in the configuration information for transmitting the random access preamble can be modified based on the information separately transmitted, for example, by an RRC signaling message.

A terminal including a controller that selects a single table from among one or more tables including a set of configuration information for transmitting a random access preamble, the one or more tables defining correspondence between information elements of the set of the configuration information and indexes; and a receiver that receives a parameter indicating that the set of the configuration information is to be modified, wherein the controller modifies, based on the parameter received by the receiver, the information elements corresponding to the indexes included in a specific numerical range in the set of the configuration information included in the selected table. According to the above-described configuration, for example, the terminal can autonomously select one table from among the RACH configuration table according to 3GP Release 15 and the RACH configuration table according to 3GPP Release 16. Furthermore, a modification in a limited range can be made, such as 2 and/or 7 is added to the existing subframe number for entries with indexes 0 to 6 in the selected RACH configuration table.

A communication method executed by a terminal, the method including receiving an index that specifies configuration information for transmitting a random access preamble; and configuring, when additional information that specifies a time domain resource for transmitting the random access preamble is received and the index falls within a specific numerical range, the time domain resource specified by the additional information, the time domain resource being configured by replacing a time domain resource for transmitting the random access preamble included in the configuration information specified by the index with the time domain resource specified by the additional information. According to the above-described configuration, for example, in a case where a time domain resource for transmitting a random access preamble included in default configuration information for transmitting the random access preamble overlaps a timing of a time domain resource for a downlink transmission in another system, the time domain resource for transmitting the random access preamble can be configured to be another time domain resource specified by the additional information. By matching the other time domain resource specified by the additional information with a timing of a time domain resource for an uplink transmission in another communication system, an effect of an interference on the other communication system caused by a random access preamble transmission can be reduced. Furthermore, since only the configuration information corresponding to an index in the specific numerical range in the RACH configuration tale is to be modified, an impact on the implementation of the terminal can be reduced.

SUPPLEMENTAL EMBODIMENTS

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the terminal 10 and the base station 20 are described using functional block diagrams, but such devices may be implemented in hardware, software, or a combination thereof. Software operated by a processor included in the terminal 10 in accordance with embodiments of the present invention and software operated by a processor included in the base station 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by base station 20 may be performed by an upper node in some cases. It is apparent that in a network consisting of one or more network nodes having base stations 20, various operations performed for communicating with terminal may be performed by at least one of the base stations 20 and network nodes other than the base stations 20 (e.g., MME or S-GW can be considered, however, the network node is not limited to these). The case is exemplified above in which there is one network node other than the base station 20. However, the network node other than the base station 20 may be a combination of multiple other network nodes (e.g., MME and S-GW).

Input and output information, or the like may be stored in a specific location (e.g., memory) or managed using management tables. Input and output information, or the like may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched along with execution. Notice of a given information (e.g. "X" notice) may also be given by implication (e.g. "no notice of the given information"), not explicitly.

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced with terms having the same or similar meanings. For example, at least one of the channels and the symbols may be a signal (signaling). The signal may also be a message.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point,"

"Reception Point," "Transmission/Reception Point," "Cell," "Sector," "Cell Group," "Carrier," "Component Carrier," and the like may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment", or "terminal" may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an IoT (Internet of Things) device such as a sensor.

In addition, the base station in the present disclosure may be read by the user terminal. For example, various aspects/embodiments of the present disclosure may be applied to a configuration in which communication between base stations and user terminals is replaced with communication between multiple user terminals (e.g., may be referred to as Device-to-Device (D2)) or Vehicle-to-Everything (V2X). In this case, a configuration may be such that the above-described function of the base station 20 is included in the user terminal 10. The terms "up" and "down" may also be replaced with the terms corresponding to terminal-to-terminal communication (e.g., "side"). For example, an uplink channel, a downlink channel, or the like, may be replaced with a sidelink channel.

Similarly, the user terminal in the present disclosure may be replaced with the base station. In this case, a configuration may be such that the above-described function of the user terminal 10 is included in the base station 20.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

When the terms "include", "including" and variations thereof are used in the present disclosure, these terms are intended to be inclusive, similar to the term "comprising". Moreover, the term "or" as used in this disclosure is not intended to be an exclusive-OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, or the like.

A slot may be formed of, in a time domain, one or more symbols (OFDM (Orthogonal Frequency Division Multiplexing) symbols, SC-FDMA (Single Carrier Frequency Division Multiple Access) symbols, etc.). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like instead of a subframe.

Here, the TTI refers to, for example, the minimum time unit of scheduling in radio communication. For example, in the LTE system, the base station performs scheduling for allocating radio resources (such as a frequency bandwidth or transmission power that can be used in each terminal 10) in units of TTIs to each terminal 10. Note that the definition of the TTI is not limited to this.

The TTI may be a transmission time unit, such as a channel coded data packet (transport block), a code block, or a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI, or a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource assignment unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth, or the like) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE is may not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, and the like are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, and the like within the TTI.

In the present disclosure, where an article is added by translation, for example, "a," "an," and "the" of English, the disclosure may include that the noun following these articles is plural.

In this disclosure, the term "A and B are different" may mean "A and B are different from each other." Note that the term may mean "A and B are different from C." Terms such as "separated" or "combined" may be interpreted similar to "different."

While the present invention is described in detail above, those skilled in the art will appreciate that the invention is not limited to the embodiments described herein. The present invention may be implemented as modifications and variations without departing from the gist and scope of the present invention as defined by the scope of the claims. Accordingly, the description herein is for purposes of illustration and is not intended to have any limiting meaning with respect to the present invention.

LIST OF REFERENCE SYMBOLS 10 terminal
110 transmitting unit
120 receiving unit
130 control unit
base station
210 transmitting unit
220 receiving unit
230 control unit
1001 processor
1002 memory
1003 storage
1004 communication device
1005 input device
1006 output device

The invention claimed is:

1. A terminal comprising:
a receiver that receives information indicating an index that specifies configuration information for transmitting a random access preamble;
a controller that modifies the configuration information by configuring, when the receiver receives additional information that specifies a time domain of a physical resource for modifying the configuration information for transmitting the random access preamble, the physical resource in the specified time domain specified by the additional information; and
a transmitter that transmits, based on the modified configuration information, the random access preamble by using the physical resource in the specified time domain,
wherein a time domain of a physical resource specified by the configuration information prior to the modification of the configuration information is overwritten by the time domain of the physical resource specified by the additional information.

2. The terminal according to claim 1, wherein the transmitter further transmits terminal capability information indicating whether a function to configure the physical resource in the specified time domain is applicable.

3. A base station comprising:
a transmitter that transmits, to a terminal, information indicating an index that specifies configuration information for transmitting a random access preamble;
a controller that modifies the configuration information by configuring, when the transmitter transmits additional information that specifies a time domain of a physical resource for modifying the configuration information for transmitting the random access preamble, the physical resource in the specified time domain specified by the additional information; and
a receiver that receives, based on the modified configuration information, the random access preamble by using the physical resource in the specified time domain,
wherein a time domain of a physical resource specified by the configuration information prior to the modification of the configuration information is overwritten by the time domain of the physical resource specified by the additional information.

4. A communication method executed by a terminal, the method comprising:
receiving information indicating an index that specifies configuration information for transmitting a random access preamble;
modifying the configuration information by configuring, upon receiving additional information that specifies a time domain of a physical resource for modifying the configuration information for transmitting the random access preamble, the physical resource in the specified time domain specified by the additional information; and
transmitting, based on the modified configuration information, the random access preamble by using the physical resource in the specified time domain,
wherein a time domain of a physical resource specified by the configuration information prior to the modification of the configuration information is overwritten by the time domain of the physical resource specified by the additional information.

5. A communication system comprising:
a base station; and
a terminal,
wherein the base station includes:
a transmitter that transmits, to the terminal, information indicating an index that specifies configuration information for transmitting a random access preamble; and
a controller that modifies the configuration information by configuring, when the transmitter transmits additional information that specifies a time domain of a physical resource for modifying the configuration information for transmitting the random access preamble, the physical resource in the specified time domain specified by the additional information, and
wherein the terminal includes:
a receiver that receives the information indicating the index;
a controller that modifies the configuration information by configuring, when the receiver receives the additional information that specifies the time domain of the physical resource for modifying the configuration information for transmitting the random access preamble, the physical resource in the specified time domain specified by the additional information; and
a transmitter that transmits, based on the modified configuration information, the random access preamble by using the physical resource in the specified time domain,
wherein a time domain of a physical resource specified by the configuration information prior to the modification of the configuration information is overwritten by the time domain of the physical resource specified by the additional information.

* * * * *